June 10, 1930.  L. UHRIN  1,762,457
MORTISING TOOL
Filed Sept. 12, 1928
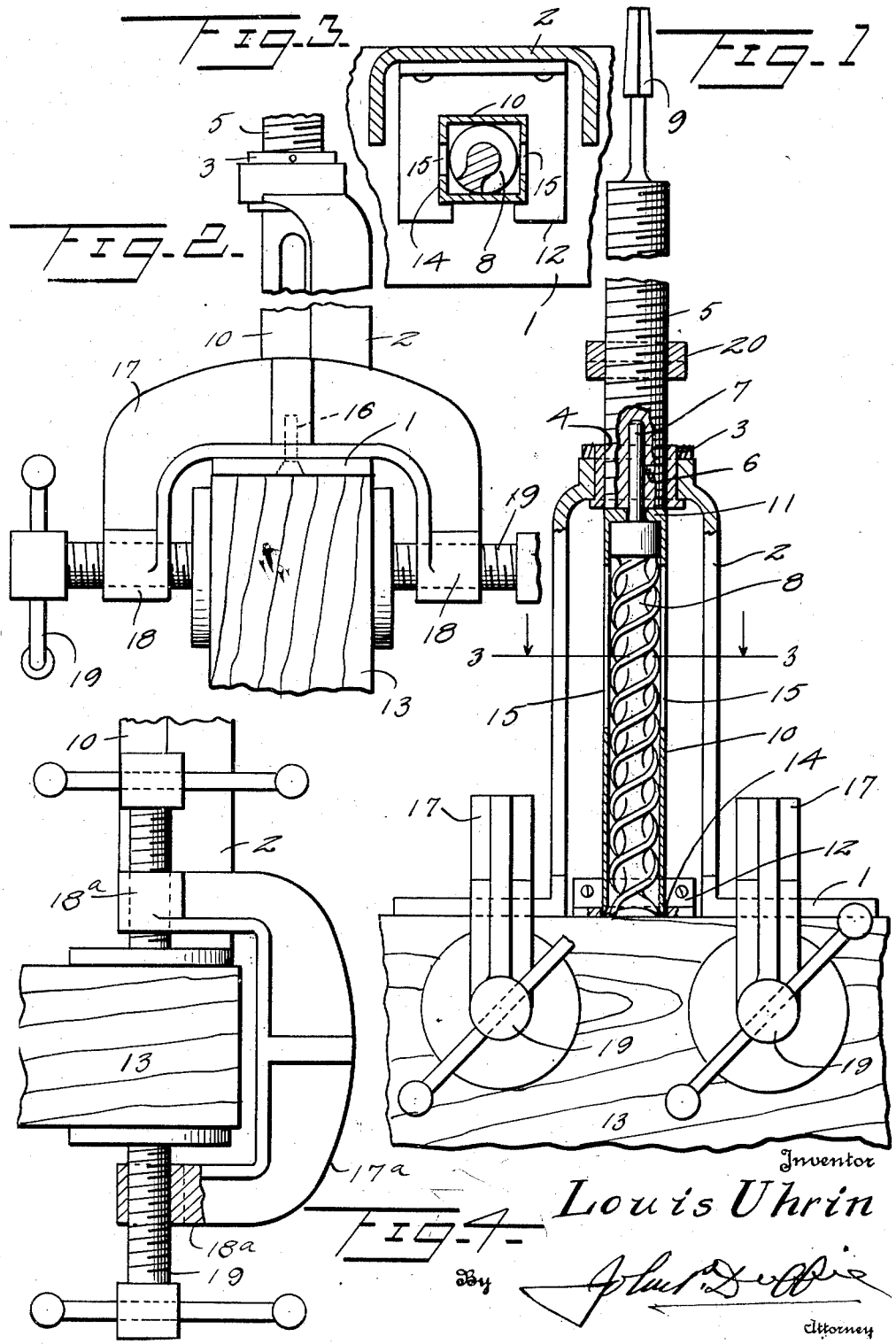
Inventor
Louis Uhrin
By
Attorney Patented June 10, 1930

1,762,457

UNITED STATES PATENT OFFICE

LOUIS UHRIN, OF WESTMINSTER, MARYLAND

MORTISING TOOL

Application filed September 12, 1928. Serial No. 305,515.

This invention relates to mortising tools, and has for its object to provide a device of this character comprising a frame having a square shaped chisel therein in which is disposed an auger and which auger extends into the end of a rotatable feed screw threaded in the frame and which feed screw is provided with a shank adapted to receive a hand turning tool, as for instance, a brace.

A further object is to provide the frame with arms adapted to engage a piece of work and U-shaped members detachably connected to the arms and having their arms provided with set screws adapted to engage the side or edge of the piece of work for securely clamping the device on the work.

A further object is to provide a depth gage comprising a nut threaded on the feed screw, which nut is adapted to be placed in different relations to the upper end of the frame for indicating the depth of mortise.

A further object is to provide the lower end of the frame with a plate through which the lower end of the chisel extends and which plate may be removed and replaced by a plate having a different chisel receiving opening when it is desired to use a different size chisel.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a front elevation of a mortising device, constructed in accordance with my invention.

Figure 2 is a side elevation.

Figure 3 is a vertical longitudinal section.

Figure 4 is a view similar to Figure 2, showing how the device may be clamped to the side of a piece of material and the remaining views are details of various features of my invention.

Referring to the drawings for a more particular description of my invention and in which drawings like parts are designated by like reference characters throughout the several views, the numeral 1 designates a flat plate base which is provided with an upwardly extending integral frame member 2, the upper end of which carries the nut 3 which is threaded, as at 4, to receive the feed screw 5. Detachably secured in the lower end of the feed screw 5 by means of a set screw 6 is the shank 7 of an auger 8, which auger rotates with the feed screw 5 as it is threaded downwardly when the feed screw is rotated. The upper end of the feed screw is provided with an angular shaped portion 9, adapted to be received in a brace or other turning tool. The auger 8 extends downwardly through a hollow chisel 10, which is of square form in cross section, and which chisel is provided with an annular flange 11 which extends around the shank 7 of the auger and prevents downward movement of the chisel except as it is fed and forced downwardly by the feed screw 5. The lower end of the chisel and auger extend through an apertured plate 12, screwed or otherwise fastened to the lower end of member 2 and it will be seen that when the device is in position on the edge of the door 13 or other piece of work, as the feed screw is fed downwardly the auger 8 will rotate, but the chisel 10 will not rotate as it extends through a square opening 14 in the plate 12. The borings are fed upwardly by the auger in the usual manner and discharged through the longitudinal slot 15 in the chisel. When a different size chisel and auger are used, the plate 12 is removed and replaced with another plate.

Detachably secured by means of countersunk screws 16 to the upper side and ends of the base plate 1, are U-shaped brackets 17, which have their arms 18 disposed downwardly and provided with clamping screws 19, which are in axial relation and when tightened against the sides of the door 13 securely clamp the device in position. By detachably securing the U-shaped brackets 17 to the plate 1, it is obvious that they may be easily removed when it is desired to clamp the device on the side of the work, as illustrated in Figure 4 of the drawings. In this instance, the brackets 17 are in a position at right-angles to that shown in Figures 1 and 2.

Threaded on the feed screw 5 is a gage nut 20, which may be placed at the desired distance above the upper end of the member 2 for indicating the depth of mortise made; therefore, it will be seen that the operator may make a cut of any desired depth.

From the above it will be seen that a mortising device is provided which may be operated by a conventional form of brace and the U-shaped brackets 17 by being detachably connected to the plate 1, allow the device to be clamped to the edge or side of the work.

Having described my invention, what I claim as new and desire to secure by Letters Patent, is:

A portable mortising machine, comprising a frame formed of a U-shaped member having terminal out-turned lugs presenting a flat base to engage the work, the bend of the U being perforated to form a seat for a nut having a flange on its lower end to seat against the U-frame, a threaded rod engaging the nut and having one end adapted to engage a bit socket, the other end having a socket to receive the shouldered shank of an auger and a hollow square chisel surrounding the auger and having an inward annular flange engaged between the shoulder on the auger shank and the end of the threaded rod.

In testimony whereof he affixes his signature.

LOUIS UHRIN.